United States Patent
Daghighian et al.

(10) Patent No.: US 7,917,041 B2
(45) Date of Patent: Mar. 29, 2011

(54) VARIABLE OPTICAL ATTENUATOR INTEGRATION INTO TRANSMITTER OPTICAL SUBASSEMBLIES

(75) Inventors: Henry M. Daghighian, Mountain View, CA (US); Kevin J. McCallion, Charlestown, MA (US)

(73) Assignee: Finisar Corporation, Sunnyvale, CA (US)

( * ) Notice: Subject to any disclaimer, the term of this patent is extended or adjusted under 35 U.S.C. 154(b) by 618 days.

(21) Appl. No.: 12/034,514

(22) Filed: Feb. 20, 2008

(65) Prior Publication Data

US 2009/0208225 A1     Aug. 20, 2009

(51) Int. Cl.
*H04B 10/04* (2006.01)
(52) U.S. Cl. .................. 398/201; 398/212
(58) Field of Classification Search ............ 398/197, 398/201, 212
See application file for complete search history.

(56) References Cited

U.S. PATENT DOCUMENTS

2007/0116286 A1* 5/2007 Yuan et al. ............ 380/256
* cited by examiner

*Primary Examiner* — Leslie Pascal
(74) *Attorney, Agent, or Firm* — Maschoff Gilmore & Israelsen

(57) ABSTRACT

A small-scale VOA system includes a polarization rotator, a voltage multiplier circuit, and at least one transistor. The polarization rotator can be positioned within a TOSA along the emission axis of a corresponding optical signal source in addition to one or more polarizers. A microcontroller provides a first low voltage control signal to a voltage multiplier to generate a large voltage DC signal which is provided to the transistor. The transistor modulates the large voltage signal with a second control signal from the microcontroller to generate a large voltage AC signal for driving the polarization rotator. The polarization rotation of the polarization rotator can be altered depending on the applied large-voltage AC signal. As a result, the polarization rotator and one or more polarizers can variably attenuate signals emitted by the optical signal source or act as a shutter.

20 Claims, 8 Drawing Sheets

VARIABLE OPTICAL ATTENUATOR INTEGRATION INTO TRANSMITTER OPTICAL SUBASSEMBLIES

CROSS-REFERENCE TO RELATED APPLICATIONS

Not Applicable.

BACKGROUND OF THE INVENTION

1. The Field of the Invention

The present invention relates generally to optoelectronic devices. More specifically, the present invention relates to optoelectronic devices with integrated variable optical attenuators.

2. The Relevant Technology

Computing, telecom and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from modest Local Area Networks to backbones that define a large portion of the infrastructure of the Internet.

In certain optical networks, such as dense wavelength division multiplexing ("DWDM") networks, multiple optical signals from multiple optical light sources are multiplexed onto a single optical fiber. Each optical signal occupies a separate wavelength channel to avoid interfering with the other optical signals. As a result, it can be crucial to maintain each of the optical signals at a constant wavelength in a DWDM network.

Typically data transmission in such networks is implemented by way of a directly modulated laser ("DML") that includes an optical light source, such as a laser diode. The optical light source emits light when current is passed through it, the intensity of the emitted light being a function of the magnitude of the current.

Alternately, data transmission can be implemented by way of an externally modulated laser ("EML") that includes an optical light source and an electro-absorption ("EA") modulator acting as a shutter. A constant current is applied to the optical light source to generate a light signal with constant intensity, and a modulation current applied to the EA modulator "opens" and "closes" the shutter.

Whether implementing a DML or an EML device, when the optical light source is first turned on, the wavelength of the emitted light signal may drift for a period of time until it stabilizes at a particular wavelength. This wavelength drift is referred to as wavelength transients and can also occur during channel selection of a tunable optical light source. Suppression of wavelength transients in a DWDM network may be highly desirable to prevent interference between optical signals.

In an EML device, wavelength transients suppression can be accomplished by simply "closing" the shutter during an initial turn-on phase or channel selection of the optical light source. Typically, however, EML devices are relatively expensive, large in size, and power hungry. Although DML devices are usually more affordable, smaller, and less power hungry than EML devices, they lack a shutter or any other wavelength transients suppression functionality.

In DWDM networks, it may also be important to maintain each of the optical signals at a particular output power. One method known in the art for changing the optical output power of an optical light source is to reduce the bias current of the optical light source. However, it is appreciated that this method changes the performance of the optical light source. Another method known in the art is to provide a separate variable optical attenuator ("VOA") at the output of the EML or DML device. However, this method adds components, cost and complexity to the DWDM network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY OF THE INVENTION

These and other limitations are overcome by embodiments of the invention which relate to systems and methods for providing integrated VOA and shutter functionality for a transmitter optical subassembly ("TOSA") in an optoelectronic device such as a transceiver or transponder. Briefly summarized, embodiments of the invention are directed to a VOA system that includes a polarization rotator, one or more transistors, and a voltage multiplier circuit. The VOA system can be integrated in whole or in part within the TOSA of an optoelectronic device to provide variable optical attenuation and shutter functionality. Advantageously, VOA systems according to embodiments of the invention are much smaller than conventional VOA and shutter devices, allowing the VOA systems to be integrated within XFP, SFP+, X2, and other small form factor modules. Moreover, the integration of VOA systems according to the invention within such modules enables these modules to operate in DWDM and/or tunable long-reach fiber-optic transmission systems without the use of bulky and power-hungry separate VOA and/or shutter devices.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
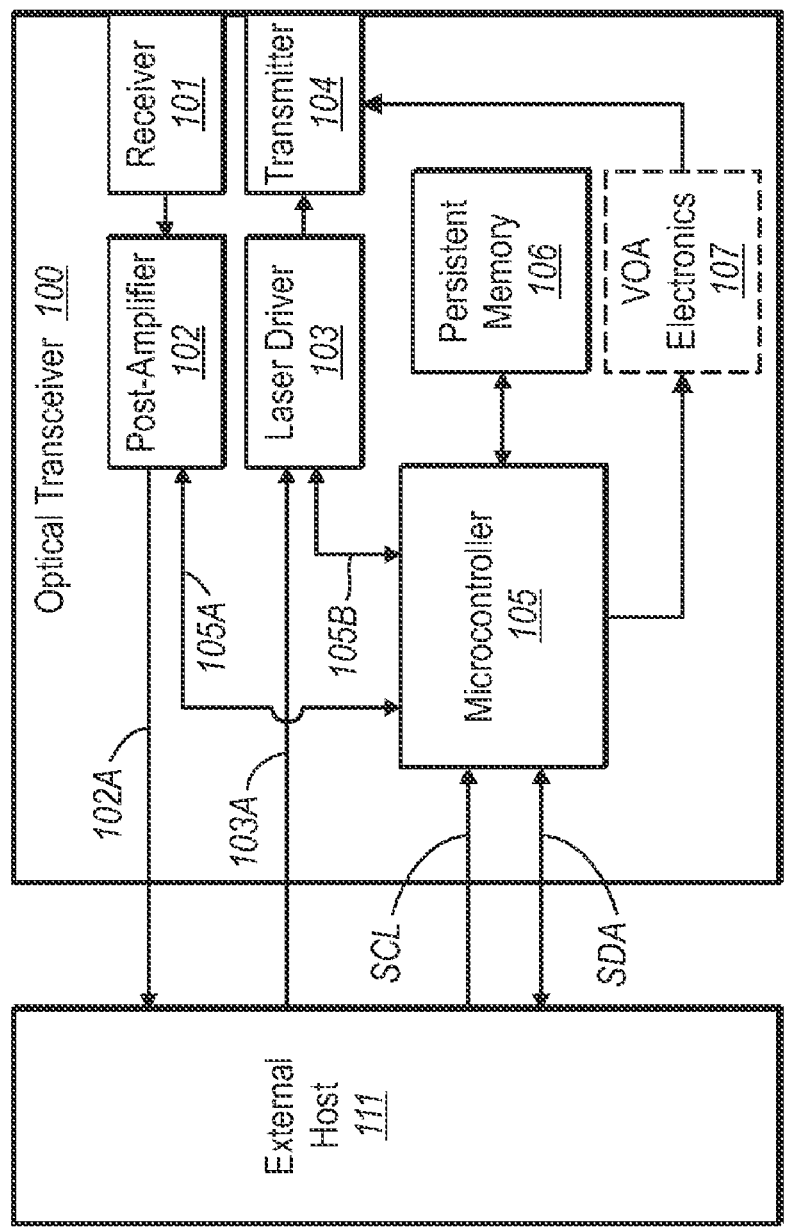
FIG. 1 illustrates an example optoelectronic device in which embodiments of a TOSA with integrated VOA can be implemented.

Embodiments of the invention relate to systems and methods for providing variable optical attenuation and shutter functionality in optoelectronic devices using a small-scale VOA system integrated in whole or in part within TOSAs of the optoelectronic devices. A VOA system according to embodiments of the invention includes a polarization rotator, such as a liquid crystal device, disposed along the light emission axis of an optical signal source within a TOSA, the TOSA additionally including one or more polarizers inline with the polarization rotator and optical signal source.

A VOA system according to embodiments of the invention additionally includes various electronic components for driving the polarization rotator, one or more of which can be integrated within the TOSA and/or remain external to the TOSA within the optoelectronic device. The various electronic components include one or more of: a voltage multiplier circuit for multiplying a first control signal received from a microcontroller of the optoelectronic device, an optional filter for cleaning the multiplied first control signal, a first transistor for modulating the multiplied first control signal with a second control signal received from the microcontroller, and optionally a second transistor for amplifying control signals from the microcontroller. In one embodiment, the second transistor is disposed between the microcontroller and the first transistor, while in another embodiment, the second transistor is disposed between the microcontroller and the voltage multiplier circuit.

In one embodiment, the first transistor may comprise a metal-oxide-semiconductor field-effect transistor ("MOS-FET") while the second transistor comprises a junction gate field-effect transistor ("JFET"), a bipolar junction transistor ("BJT"), or the like or any combination thereof. Each of the first and second control signals may comprise, for instance, a clock output or PWM signal from the microcontroller.

In a typical embodiment, the resulting modulated signal comprises a high voltage AC signal that can drive the polarization rotator without degrading the performance of the polarization rotator as can occur when driving polarization rotators with DC signals. The magnitude (e.g., amplitude), frequency, and/or duty cycle of the modulated signal determines the amount of polarization rotation provided by the polarization rotator. The amount of polarization rotation can be adjusted relative to the polarization of the one or more inline polarizers as needed for varying attenuation or shutter functionality.

The VOA system according to embodiments of the invention is small in comparison to conventional devices used for providing shutter and/or VOA functionality in EML and DML applications and additionally consumes less power than these conventional devices. As a result, the VOA system can be integrated within optoelectronic devices of various form factors, such as SFP+, XFP, X2, and the like, while having very little effect on their size and/or power budget.

Embodiments of the present invention can be implemented in various optoelectronic devices. As used herein, the term "optoelectronic device" includes devices having both optical and electrical components. Examples of optoelectronic devices include, but are not limited to transponders, transceivers, transmitters, and/or receivers. Optoelectronic devices can be used, for instance, in telecommunications networks, local area networks, metro area networks, storage area networks, wide area networks, and the like. The principles of the present invention may be implemented in optoelectronic devices of any form factor currently available or that may be developed in the future, including SFF, SFP, SFP+, XFP, X2, and 300-pin, without restriction. It will be appreciated, however, that the optoelectronic devices need not comply with standardized form factor requirements and may have any size or configuration necessary according to a particular design. The principles of the present invention are suitable for 1G, 2G, 4G, 10G and higher bandwidth fiber channels.

I. Operating Environment

FIG. 1 schematically illustrates an example optical transceiver module 100 in which the principles of the present invention may be employed. The optical transceiver 100 includes a receiver 101, post-amplifier 102, laser driver 103, transmitter 104, microcontroller 105, and persistent memory 106. The principles of the present invention enable the use of a space-efficient VOA system to provide variable optical attenuation and shutter functionality for the transmitter 104 in a relatively small footprint. While the optical transceiver 100 and the transmitter 104 will be described in some detail, they are described by way of illustration only, and not by way of restricting the scope of the invention.

In operation, the optical transceiver 100 receives an optical data signal using optical receiver 101. The receiver 101 acts as an opto-electric transducer by transforming the optical data signal into an electrical data signal. The receiver 101 provides the resulting electrical data signal to a post-amplifier 102. The post-amplifier 102 amplifies the signal and provides the amplified signal to a host 111 as represented by arrow 102A. The host 111 may be any computing system capable of communicating with the optical transceiver 100.

The optical transceiver 100 may also receive electrical data signals from the host 111 for transmission as optical data signals. Specifically, the laser driver 103 receives an electrical data signal from the host 111, as represented by the arrow 103A, and drives the optical transmitter 104 to emit an optical signal. The transmitter 104 may comprise, for example, a TOSA, and includes a suitable optical light/signal source, such as a vertical cavity surface emitting laser ("VCSEL"), a distributed feedback ("DFB") laser, a laser diode ("LD"), or the like, that is driven by the electrical signals provided by the host 111, thereby causing the light source to emit optical signals representative of the information carried in the electrical signal. Accordingly, the optical transmitter 104 serves as an electro-optic transducer.

The behavior of the optical receiver 101, the post-amplifier 102, the laser driver 103, and the optical transmitter 104 may vary dynamically due to a number of factors. For example, temperature changes, power fluctuations, and feedback conditions may each affect the performance of these components. Accordingly, the transceiver 100 includes a microcontroller 105, which may evaluate environment conditions, such as temperature, and/or operating conditions, such as emitted optical power and/or wavelength, and receive information from the post-amplifier 102 (as represented by arrow 105A), from the laser driver 103 (as represented by arrow 105B), and/or from the receiver 101 and transmitter 104. This allows the microcontroller 105 to optimize the dynamically varying performance of the transceiver 100. Specifically, the microcontroller 105 may optimize the operation of the transceiver 100 by adjusting settings on the components of the transceiver 100.

For instance, in one embodiment, the optical transceiver 100 is implemented in a network in which constant optical power, constant wavelength, or both, are desired for operation. For example, the optical transceiver 100 may be implemented in a network that uses DWDM to couple light signals from multiple transmitters into a single optical fiber. In this case, suppressing wavelength transients during initial power up and/or channel selection of the transmitter 104 and maintaining a particular optical output power (without changing the bias of the transmitter to avoid affecting the transmitter's performance) may be critical to the proper operation of the DWDM network. Accordingly, the present embodiment uses an integrated VOA system to provide shutter and variable optical attenuation functionality. In particular, the microcontroller 105 can provide one or more control signals to the VOA system to alter the polarization rotation of a polarization rotator within the VOA system, which operates in conjunction with one or more polarizers to provide more or less optical attenuation or blocking of emitted optical data signals.

The present embodiment may alternately or additionally implement power attenuation/wavelength monitoring to provide feedback to the microcontroller to adjust the polarization rotation of the polarization rotator. In this case, the microcontroller 105 may use a lookup table or calibration file to determine optical power and wavelength. Alternately or additionally, the microcontroller may use feedback from the power and wavelength monitoring to adjust settings on the optical signal source within the transmitter 104 (such as adjusting bias current and/or operating temperature) for a change in optical output power and/or emission wavelength.

The microcontroller 105 may have access to a persistent memory 106, which in one embodiment is an electrically erasable and programmable read only memory ("EEPROM"). Persistent memory 106 may also be any other non-volatile memory source. The persistent memory 106 and the control module 105 may be packaged together in the same package or in different packages without restriction. In one embodiment, the persistent memory 106 stores the lookup table and/or calibration file for determining power and/or wavelength.

Data and clock signals may be provided from the host 111 to the microcontroller 105 using the serial clock line SCL, and the serial data line SDA. Also, data may be provided from the microcontroller 105 to the host 111 using the serial data line SDA. Alternately or additionally, any suitable interface may be implemented for communication between the host 111 and microcontroller 105, such as I²C (as illustrated), MDIO, SPI, and the like or any combination thereof. In one embodiment, the host 111 can supply attenuation and/or shutter instructions to the microcontroller 105.

Although the microcontroller 105 is illustrated as being external to the transmitter 104, in other embodiments of the invention the microcontroller can be integrated within the transmitter 104 alone or in addition to one or more other electronic components typically found external to the transmitter, such as the laser driver 103, clock and data recovery ("CDR"), and a linear amplifier, and/or in addition to one or more electronic components implemented in the VOA system described below. Embodiments of an optical transmitter module with integrated electronic components are described more fully in U.S. patent application Ser. No. 11/968,581, filed Jan. 2, 2008, and entitled INTELLIGENT TRANSMITTER MODULE, which application is herein incorporated by reference in its entirety.

As indicated, anywhere from none to all of the electronic components implemented in the VOA system can be integrated within the transmitter 104. Any remaining VOA system electronics (e.g., from all to none) can optionally remain external to the transmitter 104 as shown at 107. Although not shown in FIG. 1, the polarization rotator of the VOA system is integrated within the optical transmitter 104.

II. TOSA with Integrated Polarization Rotator

Figure 2:
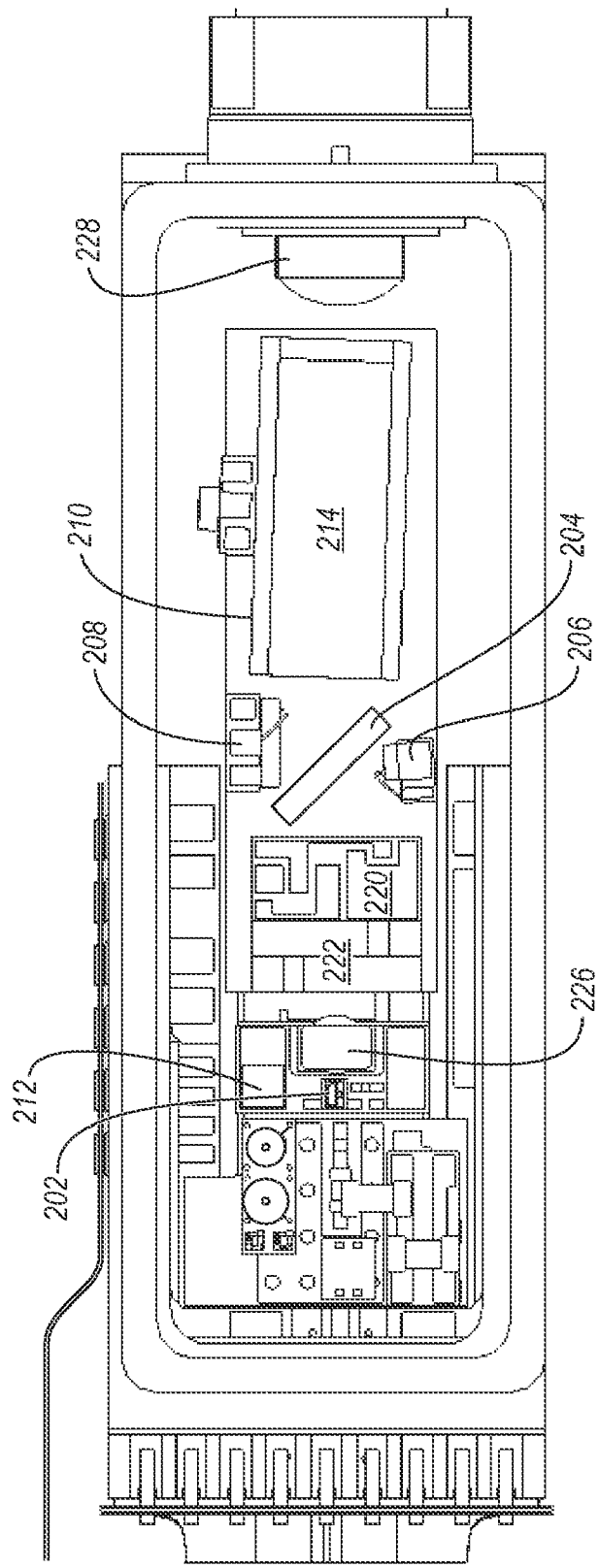
FIG. 2 illustrates an example laser with managed chirp TOSA and integrated VOA.

Turning now to FIG. 2, one embodiment of an optical transmitter or TOSA 200 is illustrated that implements an integrated polarization rotator. The TOSA 200 may correspond to the transmitter 104 of FIG. 1. As illustrated, the TOSA 200 comprises a laser with managed chirp, embodiments of which are disclosed in U.S. patent application Ser. No. 10/289,944, filed Nov. 6, 2002, and entitled POWER SOURCE FOR A DISPERSION COMPENSATION FIBER OPTIC SYSTEM, which application is herein incorporated by reference in its entirety. Embodiments of a laser with managed chirp are marketed by the Finisar Corporation as Chirp Managed Laser CML™ transmitters.

The primary components of the laser with managed chirp 200 are an optical signal source 202 (e.g., DFB laser, VCSEL, or the like) and an optical spectrum reshaper ("OSR") 210 or multi-cavity etalon filter. Basically, the OSR 210 converts a frequency modulated signal of the optical signal source 202 to an amplitude modulated signal and additionally introduces phase correlation between the bits of the signal. To implement VOA and shutter functionality, the laser with managed chirp TOSA 200 additionally includes a polarization rotator 222 and an output or exit polarizer included within optical isolator 220.

The polarization rotator 222 is positioned along the emission axis of the light source 202. The polarization rotator 222 may comprise, for instance, one or more miniature (e.g., on the order of 2×2 millimeters) liquid crystal plates or layers, a polyimide-based phase retarder, and the like or any combination thereof.

The optical isolator 220 (and consequently the exit polarizer) is positioned along the emission axis of the light source 202 following the polarization rotator 222 and allows the transmission of light in only one direction to prevent unwanted feedback (e.g., reflections) into the light source 202. The optical isolator 220 may comprise a polarization dependent isolator, a polarization independent isolator, or the like.

The polarization rotator 222 works in conjunction with the exit polarizer to provide variable optical attenuation and shutter functionalities. In particular, the polarization rotation of the polarization rotator 222 can be adjusted to provide more or less polarization rotation for more or less attenuation of emitted optical signals.

For instance, in the embodiment of FIG. 2, the light source 202 comprises a DFB laser such that light emitted by the light source 202 has a high degree of polarization. The polarization of the emitted light may be perpendicular to the polarization of the exit polarizer in this embodiment. When no voltage is applied to the polarization rotator 222, it provides 90 degrees of polarization rotation to obtain minimum optical attenuation. In this case, light emitted by the light source 202 has a first polarization (e.g., vertical). The polarization rotator 222 rotates the polarization of the light 90 degrees so that it matches (e.g., is parallel to) the polarization of the output polarizer such that all of the light, or substantially all of the light, can pass through the exit polarizer.

Alternately, a maximum voltage can be applied to the polarization rotator 222 to obtain 0 degrees of polarization rotation in order to shutter the light source 202. In this case, the polarized light emitted by the light source 202 has a first polarization that is not rotated by the polarization rotator. Thus, the polarization of the light reaching the exit polarizer is perpendicular to the polarization of the exit polarizer and none of the light passes through.

Alternately, the polarization rotator can provide between 0 degrees and 90 degrees of polarization rotation to obtain a desired attenuation level. In particular, the polarization of the light emitted by the light source 202 can be rotated some amount less than 90 degrees such that the polarization of the light includes a first component and a second component that are respectively parallel and perpendicular to the exit polarizer's polarization. In this case, only the parallel component passes through the exit polarizer.

As shown, the laser with managed chirp TOSA 200 includes a light source 202 (such as a DFB) configured to emit substantially polarized light, an exit polarizer 220 polarized perpendicular to the polarization of the light source 202, and a voltage-controlled polarization rotator 222 between the light source 202 and exit polarizer 220. One skilled in the art will appreciate that other arrangements can also be implemented. For instance, a non-polarizing light source can be implemented by including an input polarizer at the input of the polarization rotator. As another example, the positions of the polarization rotator 222 and optical isolator 220 could be swapped by configuring the polarization of the swapped optical isolator 220 such that it is perpendicular to the polarization of a polarizer within a second optical isolator following optical lens 228.

Returning to FIG. 2, the laser with managed chirp TOSA 200 may additionally include supporting optics, including a beam splitter 204 and power and wavelength detecting photodiodes 206 and 208 which can all act together with the OSR 210 as a wavelength locker. Alternately or additionally, separate monolithic power and wavelength detectors can be used to provide corresponding detection and wavelength locking functionalities in place of the power and wavelength detecting photodiodes 206 and 208 and beam splitter 204 as described in greater detail in U.S. patent application Ser. No. 12/026,368, filed Feb. 5, 2008, and entitled MONOLITHIC POWER MONITOR AND WAVELENGTH DETECTOR, which application is herein incorporated by reference in its entirety. The transmitter 200 may additionally include one or more optical lenses, including a first optical lens 226 between the laser 202 and the polarization rotator 222, and a second optical lens 228 following the OSR 210.

The transmitter 200 may additionally include various electronic components, including a first thermistor 212 for monitoring the temperature of the laser 202, a second thermistor 214 for monitoring the temperature of the OSR 210, a first thermoelectric cooler or "TEC" (not shown) for regulating the temperature of the laser 202, and a second TEC (not shown) for regulating the temperature of the OSR 210.

Advantageously, the power and wavelength detecting photodiodes 206, 208, beam splitter 204, and OSR 210 enable monitoring of the optical power attenuation and the efficiency of the VOA shutter function (which can alternately be achieved with separate monolithic detectors and the OSR 210). Briefly, the beam splitter 204 splits the light signal emerging from the optical isolator 220 into two components which are provided to the power detecting photodiode 206 and the OSR 210. The photodiode 206 generates a first photocurrent that is proportional to the power of the light signal. The OSR 210 includes a periodic structure attuned to a particular wavelength such that some of the light signal provided to the OSR 210 is reflected back to the beam splitter 204, the power of the reflected signal depending on the wavelength of the light signal. The beam splitter 204 redirects the reflected signal to the wavelength detecting photodiode 208 which generates a second photocurrent that is proportional to the wavelength-dependent power of the reflected signal. The two photocurrents are then provided to the microcontroller which can use them to determine the optical power and wavelength of the light signal emerging from the optical isolator 220, which indicate the optical power attenuation and the efficiency of the VOA shutter function. Depending on the optical power attenuation and/or VOA shutter function efficiency, the microcontroller can adjust the polarization rotation of the polarization rotator 222 as needed for more or less attenuation.

Embodiments of the invention have been described in the context of a laser with managed chirp TOSA 200. Alternately or additionally, embodiments of the invention can be implemented in conjunction with a conventional TOSA (e.g., comprising an optical signal source, optical isolator, and optionally power and wavelength detecting functionality but lacking an OSR). Furthermore, one or more of the electronic components of the VOA system according to embodiments of the invention can be integrated within the laser with managed chirp TOSA 200 (or conventional TOSA).

III. Microcontroller

Figure 3:
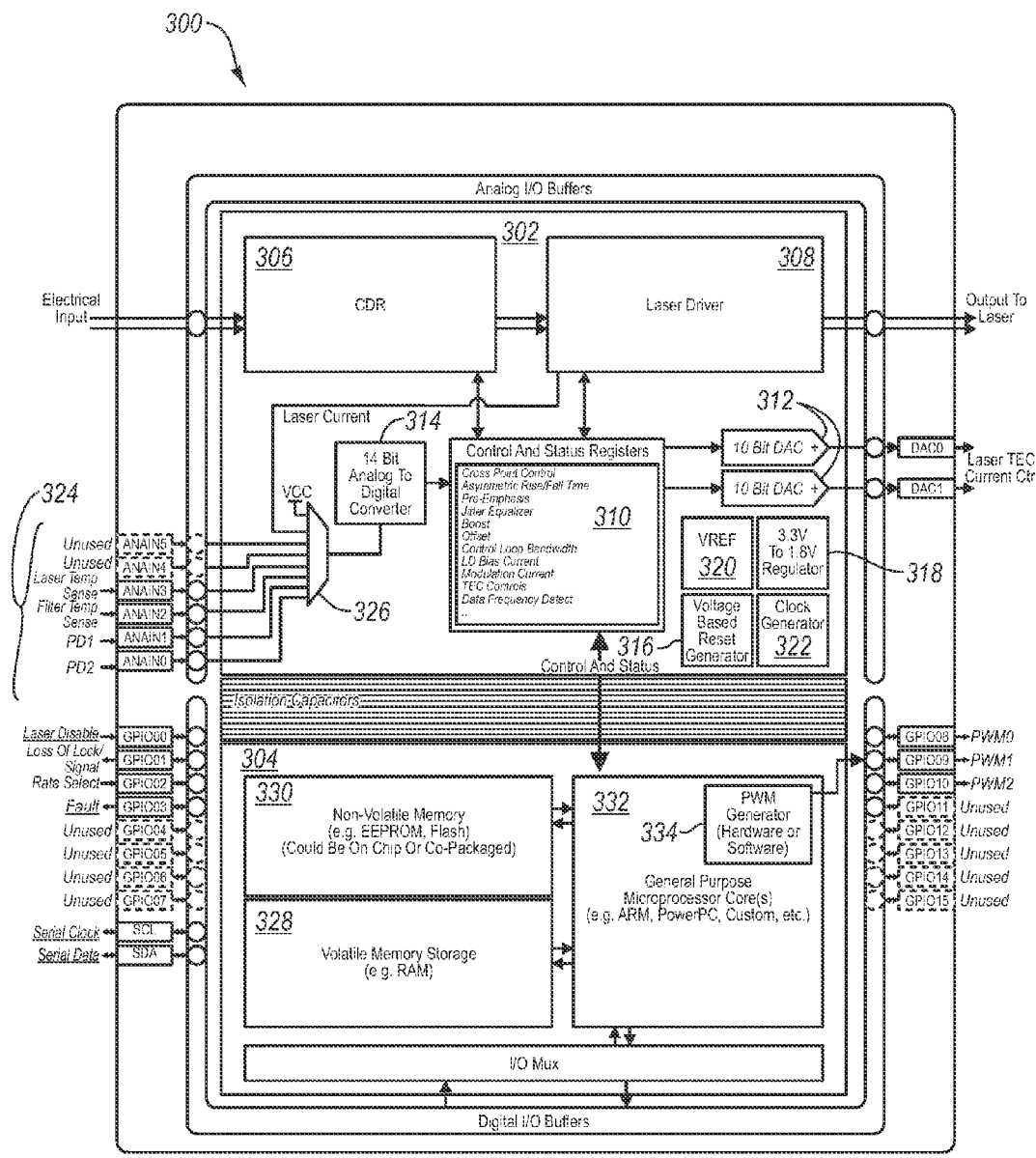
FIG. 3 is a schematic diagram depicting one embodiment of a microcontroller configured to provide pulse width modulation ("PWM") and clock signals for controlling the integrated VOA.

The VOA electronics use a pulse width modulation ("PWM") control line and/or an output clock line from the microcontroller 105 to generate AC signals (e.g., square wave or sine wave) to derive high voltage and low current signals for driving the polarization rotator. One embodiment of a microcontroller 300 (corresponding in one embodiment to microcontroller 105) that can generate PWM control and output clock lines is illustrated in FIG. 3. As shown, the microcontroller 300 includes both an analog portion 302 and a digital portion 304 that together allow the microcontroller to implement logic digitally, while still largely interfacing with other components using analog signals.

Although not required, the analog portion 302 may include one or more of a CDR 306, laser driver 308 (which would eliminate the need for the discrete laser driver 103 illustrated in FIG. 1) and one or more control capabilities 310 such as cross point control, asymmetric rise/fall time, pre-emphasis, jitter equalization, boost, offset, control loop bandwidth, laser driver bias current control, modulation current control, TEC controls, data frequency detect, and the like or any combination thereof. The analog portion may further include one or more digital to analog converters ("DACs") 312, analog to digital converters ("A2Ds") 314, high speed comparators (e.g., for event detection), voltage-based reset generators 316, voltage regulators 318, voltage references 320, a clock generator 322, and other analog components. In one embodiment, a clock signal generated by the clock generator 322 is provided to the VOA system as described below.

The analog portion 302 may include one or more sensors for measuring operation parameters (such as laser bias current) and/or may receive external analog signals from a laser with managed chirp TOSA and/or other components. Six external lines 324 are illustrated for receiving such external analog signals, although there may be more or less of such lines. As shown, two external lines (labeled "PD1" and "PD2") receive photocurrents from the power and wavelength detectors 206, 208 to facilitate optical attenuation and VOA shutter efficiency monitoring, two external lines (labeled "Laser Temp Sense" and "Filter Temp Sense") receive temperature currents from the two TECs, and two of the external lines (both labeled "Unused") are unused.

The analog signals generated by the one or more sensors and/or received over the external lines 324 are converted to digital signals so as to be available to the digital portion 304 of the microcontroller 300 for further processing. Of course, each analog parameter value may have its own A2D. However, to preserve chip space, each signal may be periodically sampled in a round robin fashion using a single A2D 314. In this case, each analog value may be provided to a multiplexer 326, which may select, in a round robin fashion, one of the analog signals at a time for sampling by the A2D 314. Alternatively, multiplexer 326 may be programmed to allow for any order of analog signals to be sampled by the A2D 314. As shown, the A2D 314 includes 14-bit resolution, although this is not required in all embodiments.

The digital portion 304 may include various digital components, such as a timer module for providing timing signals, host communication interface, external device interface, memory controller, and the like or any combination thereof. Additionally, the digital portion 304 includes internal system memory 328 that may be random access memory ("RAM"), a processor, register, flip-flop, or other memory device. Optionally, the microcontroller IC 300 may include on-chip or co-packaged non-volatile memory 330 (e.g., EEPROM, FLASH, and the like), corresponding to the persistent memory 106 of FIG. 1.

A general-purpose processor 332 is also included in the digital portion 304. The processor 332 recognizes instructions that follow a particular instruction set, and may perform normal general-purpose operations such as shifting, branching, adding, subtracting, multiplying, dividing, Boolean operations, comparison operations, and the like. In one embodiment, the general-purpose processor 332 is a 16-bit processor. The precise structure of the instruction set is not important to the principles of the present invention as the instruction set may be optimized around a particular hardware environment, and as the precise hardware environment is not important to the principles of the present invention.

The general-purpose processor 332 includes a PWM generator 334 that can be implemented in hardware, software, or a combination of hardware and software. The PWM generator 334 generates PWM control signals that can be provided to the VOA system for driving the polarization rotator 222, as will be described below.

IV. VOA Functional Elements

Figure 4:
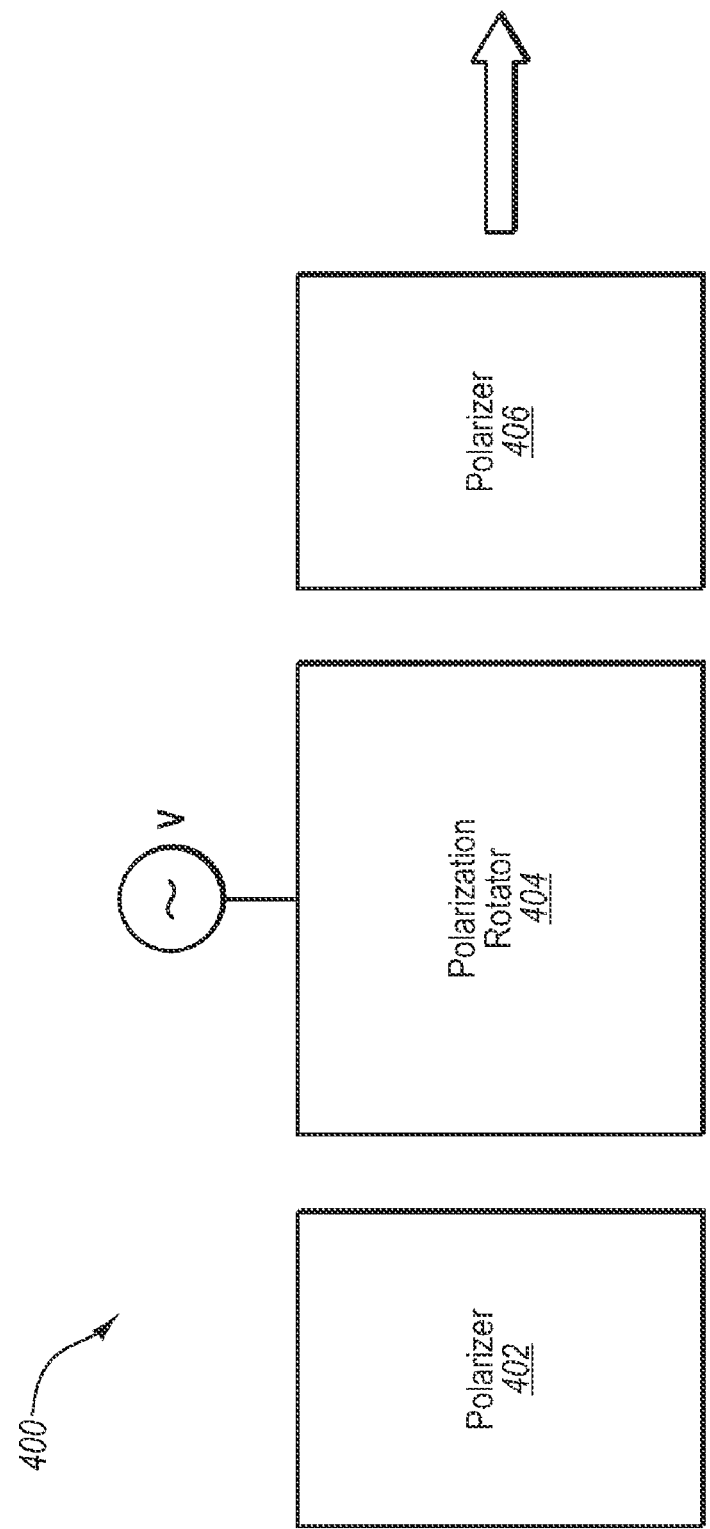
FIG. 4 illustrates components of an integrated VOA system that includes an input polarizer, a polarization rotator, and an output polarizer.

With additional reference to FIG. 4, a block diagram of VOA functional optical elements 400 that may be implemented in a TOSA is provided. The VOA functional elements include input polarizer 402, polarization rotator 404, and output polarizer 406. The input polarizer 402 may correspond to the polarizing light source 202 of FIG. 2 or to a separate optical component. The polarization rotator 404 may correspond to the polarization rotator 222. The output polarizer 406 may correspond to the exit polarizer within the optical isolator 220.

As explained above, the polarizations of the input polarizer 402 and the output polarizer 406 may be crossed, such as at 90 degrees to one another. The polarization of light traveling through the polarization rotator 404 can be rotated depending on the signal applied to the polarization rotator. The variable polarization rotation, in conjunction with the crossed input and output polarizers 402, 406, allows the functional components 400 to either variably attenuate the optical signals emitted by the optical signal source or to act as a shutter to the emitted optical signals.

Figure 5A:
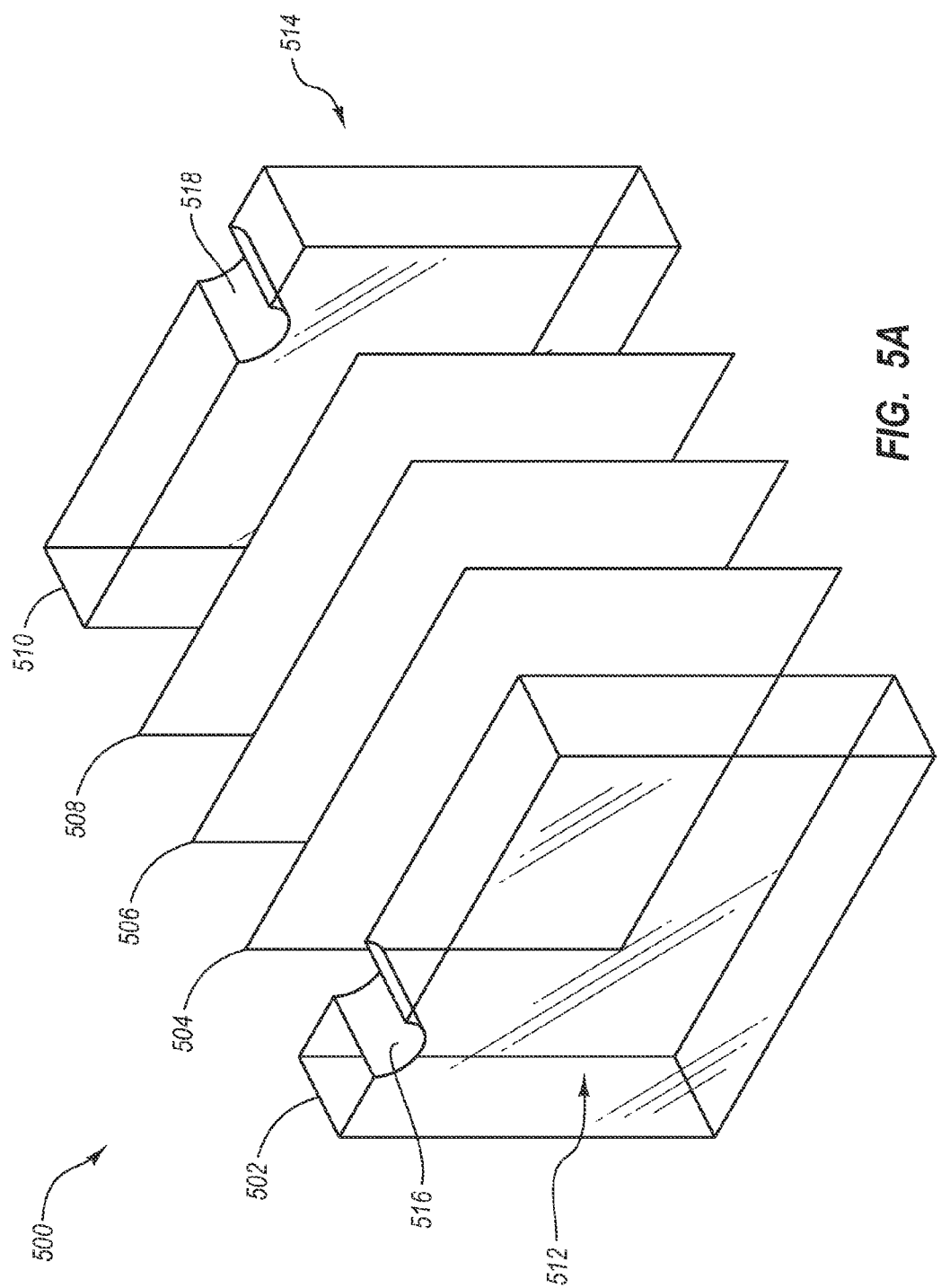
FIG. 5 depicts one embodiment of the polarization rotator of FIG. 4.
Figure 5B:
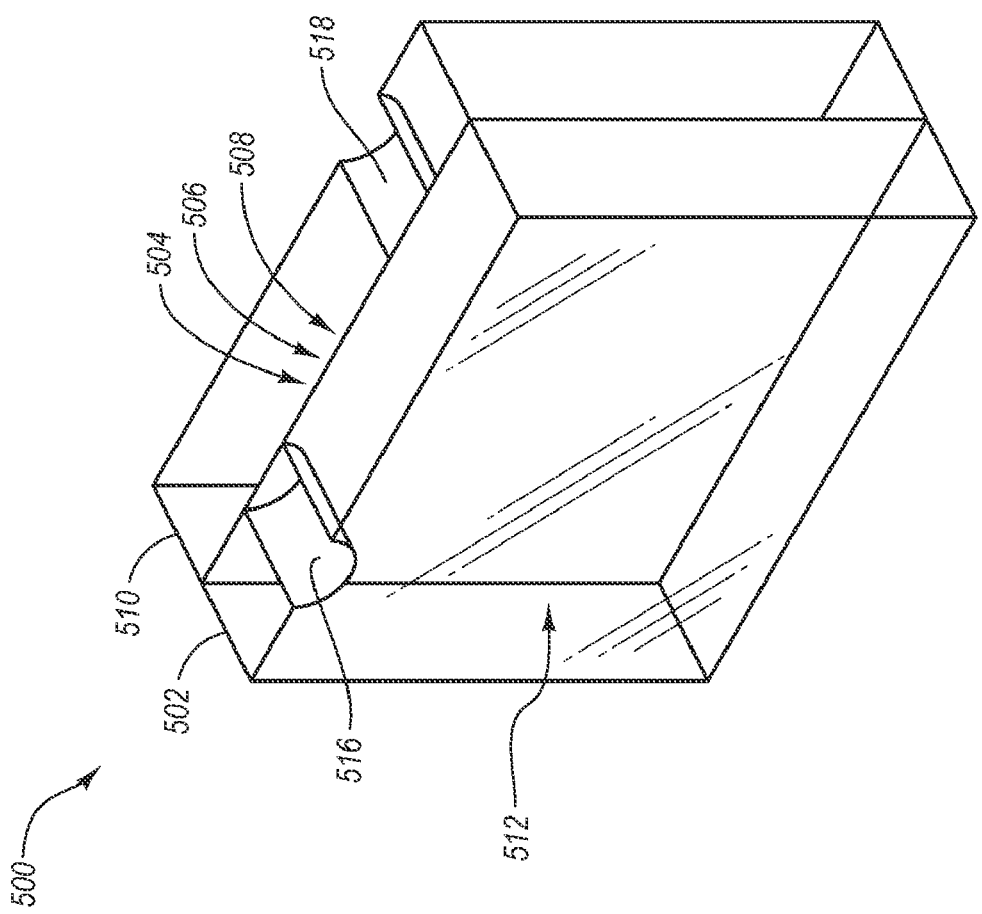

Turning now to FIGS. 5A and 5B, one embodiment of a liquid crystal ("LC") polarization rotator 500 is illustrated that may correspond to the polarization rotators 222 and 404 of FIGS. 2 and 4, respectively. FIG. 5A illustrates an exploded view of the LC polarization rotator 500 while FIG. 5B illustrates an assembled view of the LC polarization rotator 500.

The LC polarization rotator 500 includes a first glass plate 502, first transparent metallization layer 504, LC layer 506, second transparent metallization layer 508, and second glass plate 510. The transparent metallization layers 504, 508 may comprise, for instance, indium-tin-oxide ("ITO"), indium-zinc-oxide ("IZO"), and the like or any combination thereof. According to one embodiment of the invention, anti-reflective ("A/R") coatings are applied to the front face 512 of the first glass plate 502 and to the rear face 514 of the second glass plate 510. Additionally, optical reflections can be suppressed at the LC layer 506.

As shown in FIGS. 5A and 5B, each of the first and second glass plates 502, 510 may include a via hole 516, 518. The via holes 516, 518 provide electrical connections to the first and second metallization layers 504, 508, respectively, and can be gold-plated in one embodiment.

V. VOA System

Figure 6A:
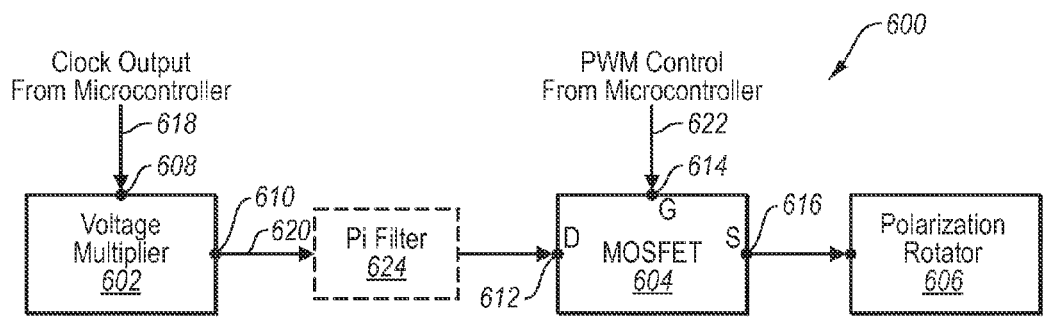
FIGS. 6A-6C depict embodiments of a VOA system including various electronic components and a polarization rotator.

Turning now to FIG. 6A, an example VOA electrical system 600 according to embodiments of the invention is depicted. The VOA electrical system 600 includes a voltage multiplier circuit 602, a first transistor 604, and a polarization rotator 606 (which may correspond to the polarization rotator 222 of FIG. 2). In the illustrated embodiment, the first transistor 604 comprises a MOSFET. The voltage multiplier circuit 602 includes an input node 608 and an output node 610. The MOSFET 604 includes various terminals, including drain terminal 612, gate terminal 614, and source terminal 616.

The input node 608 of the voltage multiplier is coupled to a microcontroller while the output node 610 is coupled to drain terminal 612 of the MOSFET 604. The gate terminal 614 is coupled to the microcontroller and the source terminal 616 is coupled to the polarization rotator 606. Note that, as used herein, "coupled to" is defined to mean both a direct connection between two or more circuit objects without any intervening circuit objects and an indirect connection between two or more circuit objects with one or more intervening circuit objects. For example, two circuit objects directly connected to each other are "coupled to" one another. The same two circuit objects would also be "coupled to" each other if there were one or more intervening circuit objects connected between them.

In operation, the voltage multiplier circuit 602 receives a clock signal 618 (e.g., a PWM clock) from the microcontroller at its input node 608. The clock signal 68 may be a relatively low voltage AC signal, between 0.2 and 0.5 volts in some embodiments, although this is not required in all embodiments. The voltage multiplier 602 multiplies the clock signal 608 to generate a large voltage (and low current) DC signal 620 at its output node 610, which is provided to the drain 612 of the MOSFET 604. The large voltage signal 60 may be between 20 and 30 volts in some embodiments. An optional pi filter 624 may be coupled between the output 610 of the voltage multiplier 602 and the drain 612 of the MOSFET 604 to clean up AC noise associated with the voltage multiplier circuit The MOSFET 604 receives a PWM control signal 622 from the microcontroller at its gate terminal 614. The PWM control signal 622 at the gate terminal 614 is an AC signal that modulates the large voltage DC signal 620 to generate a modulated large voltage AC signal at the source terminal 616 for driving the polarization rotator 606.

Figure 6B:
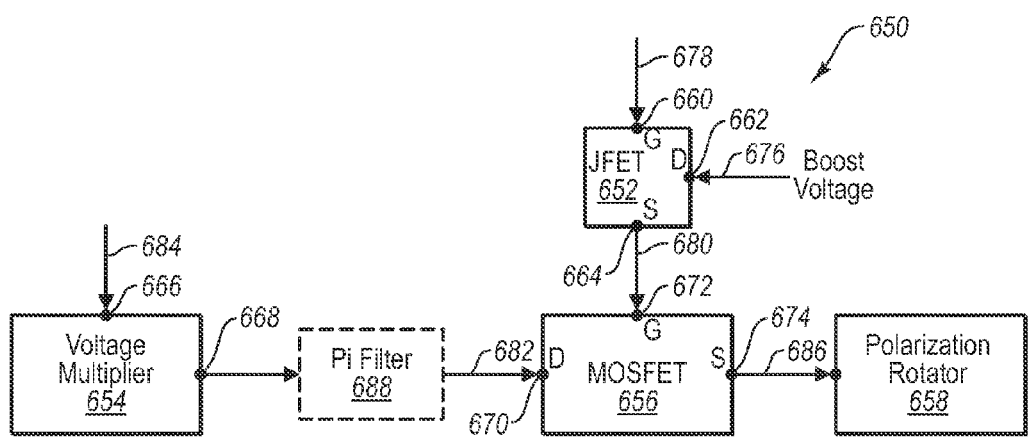

FIG. 6B illustrates another embodiment of a VOA electrical system 650 that includes a second transistor 652 for driving the gate of a first transistor 656. The VOA electrical system 650 additionally includes a voltage multiplier circuit 654, a polarization rotator 658, and an optional pi filter 688. The second transistor 652 may comprise a JFET, BJT, or the like. As shown, the second transistor 652 is a JFET and includes gate terminal 660, drain terminal 662, and source terminal 664, while the voltage multiplier circuit 654 includes input and output nodes 666, 668, respectively, and the first transistor 656 comprises a MOSFET that includes drain terminal 670, gate terminal 672, and source terminal 674.

The gate terminal 660 of the JFET 652 is coupled to the microcontroller, the drain terminal 662 of the JFET is coupled to boost voltage 676, and the source terminal 664 of the JFET is coupled to the gate terminal 672 of the MOSFET 656. The input node 666 of the voltage multiplier 654 is coupled to the microcontroller and the output node 668 of the voltage multiplier is coupled to the drain terminal 670 of the MOSFET (with the optional pi filter 688 coupled between the output node 668 of the voltage multiplier and the drain terminal 670 of the MOSFET when implemented). The source terminal 674 of the MOSFET 656 is coupled to the polarization rotator 658.

In operation, the JFET 652 receives boost voltage 676 at its drain terminal 662 that is modulated by a very low voltage signal 678 received at its gate terminal 660 to generate an amplified signal 680 at its source terminal 664. The very low voltage signal 678 may comprise a clock output or PWM control signal from the microcontroller that may range between 0.2 to 0.5 volts in some embodiments. The boost voltage 676 may comprise, for instance, a 3 volt signal.

The amplified signal 680 is received at the gate terminal 672 of the MOSFET 656 and processed as in FIG. 6A. In particular, the voltage multiplier 654 multiplies a clock output or PWM signal 684 from the microcontroller to generate a large voltage DC signal 682. AC noise associated with the voltage multiplier 654 can be cleaned from the large voltage DC signal 682 in one embodiment by implementing the optional pi filter 688. In the MOSFET 656, the amplified signal 680 modulates the large voltage DC signal 682 to generate a modulated large voltage AC signal 686 for driving the polarization rotator 658. The large voltage AC signal 686 can be used to control the amount of polarization rotation of the polarization rotator 658 to provide VOA and shutter functionality in conjunction with one or more polarizers within a TOSA as explained above.

According to one embodiment of the invention, the configuration of FIG. 6B can be implemented when the PWM or clock signal 678 is a low voltage signal. In particular, the second transistor 652 can be used to amplify the control signal 678 to drive the first transistor 656. Alternately or additionally, a second transistor can be implemented to amplify the control signal provided at the input of a voltage multiplier circuit, as illustrated in FIG. 6C.

Figure 6C:
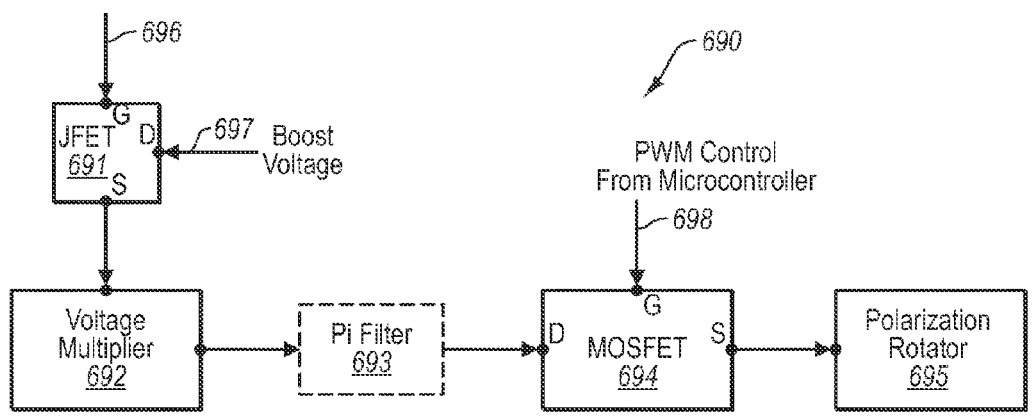

FIG. 6C is similar in many respects to FIG. 6B. In particular, the VOA electrical system 690 illustrated in FIG. 6C includes a second transistor 691 (comprising a JFET or a BJT), a voltage multiplier 692, a first transistor 694 (comprising a MOSFET), a polarization rotator 695, and an optional pi filter 693. In this embodiment, however, the second transistor 691 is coupled to the input node of the voltage multiplier 692 instead of being coupled to the gate of the MOSFET 694.

In more detail, the gate terminal of the JFET 691 is coupled to the microcontroller for receiving first control signal 696, the drain terminal of the JFET 691 is coupled to boost voltage 697, and the source terminal of the JFET 691 is coupled to the input node of the voltage multiplier 692. The output node of the voltage multiplier 692 is coupled (through the optional pi filter 693 when implemented) to the drain terminal of the MOSFET 694. The gate terminal of the MOSFET 694 is coupled to the microcontroller for receiving the second control signal 698, and the source terminal of the MOSFET 694 is coupled to the polarization rotator 695.

The operation of the VOA system 690 of FIG. 6C is similar to the operation of the VOA system 650 of FIG. 6B, with the difference of the second transistor 691 providing its amplified control signal to the voltage multiplier 692 instead of to the first transistor 694.

Figure 7:
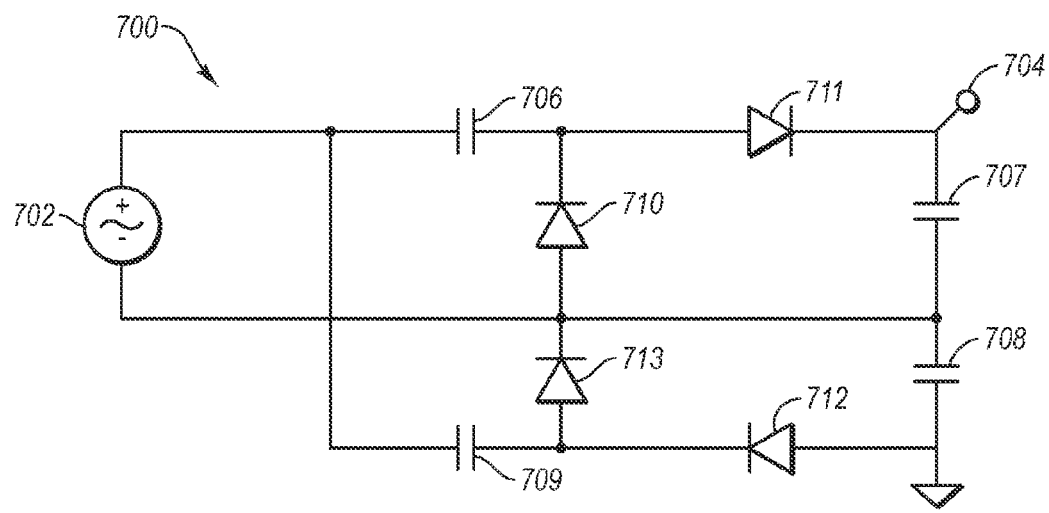
FIG. 7 illustrates one example of a voltage multiplier circuit that can be implemented in VOA systems according to embodiments of the invention.

With additional reference to FIG. 7, one embodiment of a voltage multiplier circuit 700 is illustrated that may correspond to the voltage multipliers 602, 654 of FIGS. 6A and 6B. In the present embodiment, the voltage multiplier circuit 700 comprises a simple Cockcroft-Walton multiplier, although other voltage multipliers may alternately or additionally be implemented in embodiments of the invention.

The voltage multiplier 700 includes input node 702 and output node 704 which may correspond to input and output nodes 608, 666, 610, and 668 of FIGS. 6A and 6B. The voltage multiplier 700 receives the low voltage AC clock signal or PWM control signal from the microcontroller at its input node 702 and provides the multiplied DC signal at its output node 704.

The voltage multiplier 700 further includes a plurality of capacitors 706-709 and a plurality of diodes 710-713. Although the voltage multiplier 700 illustrated in FIG. 7 includes a total of four capacitors and four diodes, the voltage multiplier may optionally include more than four capacitors and four diodes to provide additional multiplication. Additionally, the voltage multiplier circuit 700 may be provided within a VOA system as a single integrated circuit or as multiple off-the-shelf dies and/or packages. For instance, the four (or more) capacitors 706-709 can be provided as an off-the-shelf capacitor array in die or package form while the four (or more) diodes 710-712 can also be provided as an off-the-shelf component in die or package form.

Figure 8:
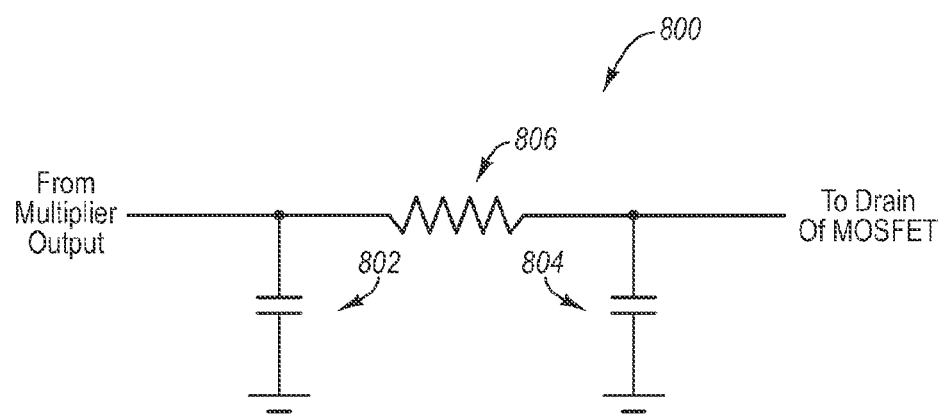
FIG. 8 illustrates one example of a pi filter that can be implemented in a VOA system at the output of a voltage multiplier circuit to clean up associated AC noise.

With additional reference to FIG. 8, one embodiment of a pi filter 800 is illustrated that may correspond to the optional pi filter 624, 688 of FIGS. 6A and 6B. As previously indicated, the pi filter 800 can be coupled between the output of the voltage multiplier and the drain terminal of the MOSFET to clean up AC noise associated with voltage multiplier.

As shown, the pi filter 800 includes first and second capacitors 802, 804 and a resistor 806. The pi filter 800 is a low pass filter and in one embodiment includes 20 dB/octave attenuation. Each of the capacitors 802, 804 are grounded with the resistor 806 linking the top terminals of the capacitors 802, 804. In one embodiment, the first capacitor 802 is a 0.1 micro-farad capacitor, the second capacitor 804 is a 0.01 micro-farad capacitor, and the resistor is a 2 kilo-ohm resistor. It is appreciated that the values described for the capacitors 802, 804 and the resistor 806 are provided by way of example only, and should not be construed to limit the scope of the invention.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A variable optical attenuator system for use within an optoelectronic device, comprising:
    a voltage multiplier circuit having an input node coupled to a microcontroller of an optoelectronic device and an output node coupled to a first terminal of a first transistor, wherein the voltage multiplier circuit multiplies a first control signal received from the microcontroller and provides the resulting multiplied control signal to the first terminal of the first transistor;
    the first transistor having the first terminal coupled to the output node of the voltage multiplier circuit, a second terminal coupled to the microcontroller, and a third terminal coupled to a polarization rotator, wherein the first transistor modulates the multiplied control signal with a second control signal received from the microcontroller at the second terminal and provides the resulting modulated control signal to the polarization rotator; and
    the polarization rotator disposed within a transmitter optical subassembly of the optoelectronic device and positioned along the emission axis of a corresponding optical light source, wherein the application of the modulated control signal to the polarization rotator alters the amount of polarization rotation applied to an optical data signal emitted by the optical light source, the optical data signal having a first polarization at the input of the polarization rotator;
    wherein the transmitter optical subassembly includes an exit polarizer positioned along the emission axis of the optical light source following the polarization rotator and having a second polarization such that altering the polarization rotation of the polarization rotator varies the attenuation of the optical data signal.

2. The system of claim 1, wherein the voltage multiplier circuit includes a plurality of diodes and a plurality of capacitors.

3. The system of claim 2, wherein the plurality of diodes and the plurality of capacitors are each in one or more of die form and package form.

4. The system of claim 1, further comprising a pi filter coupled between the output node of the voltage multiplier circuit and the first terminal of the first transistor, wherein the pi filter is configured to reduce AC noise from the multiplied control signal.

5. The system of claim 1, wherein the polarization rotator includes one or more of a liquid crystal polarization rotator and a polyimide-based phase retarder.

6. The system of claim 5, wherein a liquid crystal polarization rotator includes a first glass plate coupled to a first metallization layer, a second glass plate coupled to a second metallization layer, a liquid crystal layer disposed between the first and second metallization layers, a first via hole in the first glass plate providing an electrical connection to the first metallization layer, and a second via hole in the second glass plate providing an electrical connection to the second metallization layer.

7. The system of claim 6, wherein the first and second metallization layers include one or more of indium-tin-oxide and indium-zinc-oxide.

8. The system of claim 6, wherein the first and second via holes are plated with gold.

9. The system of claim 6, further comprising a first anti-reflective coating on an input surface of the first glass plate and a second anti-reflective coating on an output surface of the second glass plate.

10. The system of claim 1, further comprising a second transistor coupled between:
    the microcontroller and the input node of the voltage multiplier circuit to provide amplification of the first control signal, the second transistor having a first terminal coupled to the microcontroller, a second terminal coupled to the input node of the voltage multiplier circuit, and a third terminal coupled to an alternating current voltage source; or
    the microcontroller and the second terminal of the first transistor to provide amplification of the second control signal, the second transistor having a first terminal coupled to the microcontroller, a second terminal coupled to the second terminal of the first transistor, and a third terminal coupled to an alternating current voltage source.

11. A transmitter optical subassembly with integrated variable optical attenuation and shutter functionality, the transmitter optical subassembly comprising:
- an optical signal source configured to emit optical data signals having a first polarization;
- a polarization rotator positioned along the emission axis of the optical signal source and configured to variably rotate the first polarization of the optical data signals to a second polarization depending on a signal applied to the polarization rotator; and
- an exit polarizer positioned along the emission axis of the optical signal source following the polarization rotator and configured to provide variable optical attenuator or shutter functionality in conjunction with the polarization rotator, the exit polarizer having a third polarization;
- wherein the polarization rotator is configured to be driven by a modulated signal received from a first transistor, the modulated signal being generated by the first transistor by modulating a multiplied signal received from a voltage multiplier circuit with a first control signal received from a microcontroller, the multiplied signal being generated by the voltage multiplier circuit by multiplying a second control signal received from the microcontroller.

12. The transmitter optical subassembly of claim 11, further comprising an optical spectrum reshaper positioned along the emission axis of the optical signal source following the exit polarizer and configured to reshape the optical data signals.

13. The transmitter optical subassembly of claim 11, wherein one or more of the first transistor, all or a portion of the voltage multiplier circuit, and the microcontroller are included: within the transmitter optical subassembly, within an optoelectronic device in which the transmitter optical subassembly is implemented and external to the transmitter optical subassembly, or both.

14. The transmitter optical subassembly of claim 11, wherein if the first polarization is parallel to the second polarization and perpendicular to the third polarization, the polarization rotator and exit polarizer act as a shutter within the transmitter optical subassembly.

15. The transmitter optical subassembly of claim 11, further comprising a power detecting photodiode for detecting the optical power of emitted data signals, and a wavelength detecting photodiode for detecting the wavelength of emitted data signals, wherein the microcontroller can use one or both of the optical power and wavelength measurements for determining the optical attenuation provided by the polarization rotator and the exit polarizer.

16. An optoelectronic device for use in optical communication networks, the optoelectronic device comprising:
- a transmitter optical subassembly including:
  - an optical signal source configured to emit optical data signals having a first polarization;
  - a polarization rotator positioned along the emission axis of the optical signal source; and
  - an exit polarizer positioned along the emission axis of the optical signal source and following the polarization rotator;
  - wherein the first polarization of the emitted optical data signals is different than a second polarization of the exit polarizer and wherein the amount of polarization rotation of the polarization rotator is alterable by the application of a signal to the polarization rotator such that the polarization rotator and exit polarizer can variably attenuate emitted optical data signals or act as a shutter for emitted optical data signals depending on the polarization rotation of the polarization rotator;
- a microcontroller configured to control operation of the polarization rotator;
- a voltage multiplier circuit coupled to the microcontroller and configured to multiply a first control signal received from the microcontroller; and
- a first transistor having a first terminal coupled to the output of the voltage multiplier circuit for receiving the multiplied first control signal, a second terminal coupled to the microcontroller for receiving a second control signal to modulate the multiplied first control signal, and a third terminal coupled to the polarization rotator for driving the polarization rotator with the resulting modulated signal.

17. The optoelectronic device of claim 16, wherein the first control signal comprises a clock signal or a pulse width modulation signal and the second control signal comprises a clock signal or a pulse width modulation signal.

18. The optoelectronic device of claim 16, wherein the voltage multiplier circuit includes a plurality of components, and wherein one or more of the microcontroller, first transistor, and one or more components of the voltage multiplier circuit are included: within the transmitter optical subassembly, external to the transmitter optical subassembly, or both.

19. The optoelectronic device of claim 16, wherein the first transistor comprises a metal-oxide-semiconductor field-effect transistor and the first terminal comprises a drain terminal, the second terminal comprises a gate terminal, and the third terminal comprises a source terminal.

20. The optoelectronic device of claim 16, further comprising a pi filter coupled between the output of the voltage multiplier circuit and the first terminal of the first transistor.

* * * * *